INVENTOR
JOSEPH KOLBINGER
BY John M. Calimafde
ATTORNEYS

LINE CIRCUIT FOR TELEPHONE SYSTEM

Filed June 23, 1959 2 Sheets-Sheet 2

INVENTOR
JOSEPH KOLBINGER
BY [signature]
ATTORNEYS

United States Patent Office 3,134,857
Patented May 26, 1964

3,134,857
LINE CIRCUIT FOR TELEPHONE SYSTEM

Joseph Kolbinger, % Harry F. Bradley, Telephone Sales and Service Company, 97 Warren St., New York 7, N.Y., assignor of fifty percent to Harry F. Bradley, New York, N.Y.

Filed June 23, 1959, Ser. No. 822,346
9 Claims. (Cl. 179—18)

Figure 1:
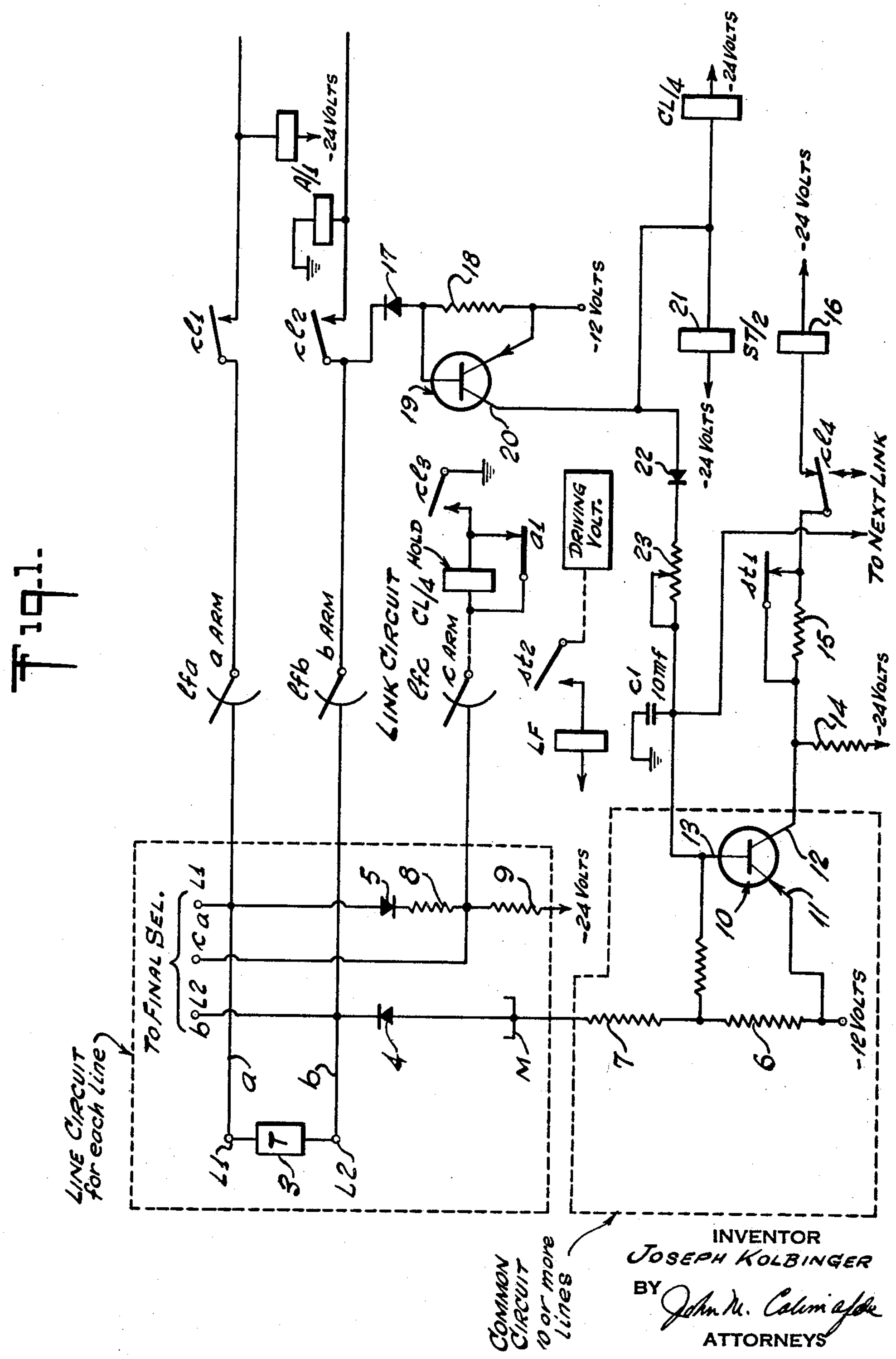

This invention relates to a novel line circuit for connecting a telephone to a link circuit at the exchange, and more particularly to a line circuit which is adapted to be disconnected from the talking wires after the connection between the telephone and the link circuit is made.

The line circuit generally comprises a loop through the telephone, which loop is completed upon the removal of the hand-set from the telephone base. In the conventional line circuit, relays are employed in the loop for disconnecting the loop after the talking connection is made through the link circuit. Since relays are mechanical in operation, they require maintenance and are subject to failures generally suffered by mechanically moving parts. Considerable effort, therefore, has been made in recent years to obviate the necessity for the relays in the line circuit. The development has tended towards the direction of using high voltage, cold cathode tubes. However, high voltage is generally undesirable in the line circuit and little use, therefore, has been made of such tubes.

Accordingly, it is an object of this invention to provide a novel switching system, including a line circuit, which operates on relatively low voltage and which has eliminated the use of relays, or high voltage cold cathode tubes. The invention utilizes germanium or silicon type diodes, which operate on relatively low voltage.

It is a further object of the invention to provide unique circuits for testing the connection between the talking wires and the link circuit and for disconnecting the line circuit from the talking wires after the connection has been made.

In accordance with an aspect of the invention, the line circuit comprises a pair of switching diodes connected, respectively, to the wires of a subscriber's line and serially in a loop through the subscriber's telephone. A source of potential difference is connected across the loop, so that current flows in the loop when the subscriber lifts his hand-set. The telephone system includes a call detector circuit coupled to the loop and operative in response to current flowing in the loop for operating a line finder relay. A line finder is provided for each of the subscriber's wires and is responsive to the operation of the line finder relay for detecting the calling subscriber. A test circuit is connected to one of the line finders and is operative in response to the current flowing in the loop when the line finder detects a calling subscriber line. The test circuit in its operating condition includes a first branch for rendering ineffective the line finder relay, and a second branch for closing normally open contacts in the line circuit and means for opening the loop, whereby the subscriber's wires are connected to the link circuit and the line circuit is disconnected from the talking wires.

Figure 2:
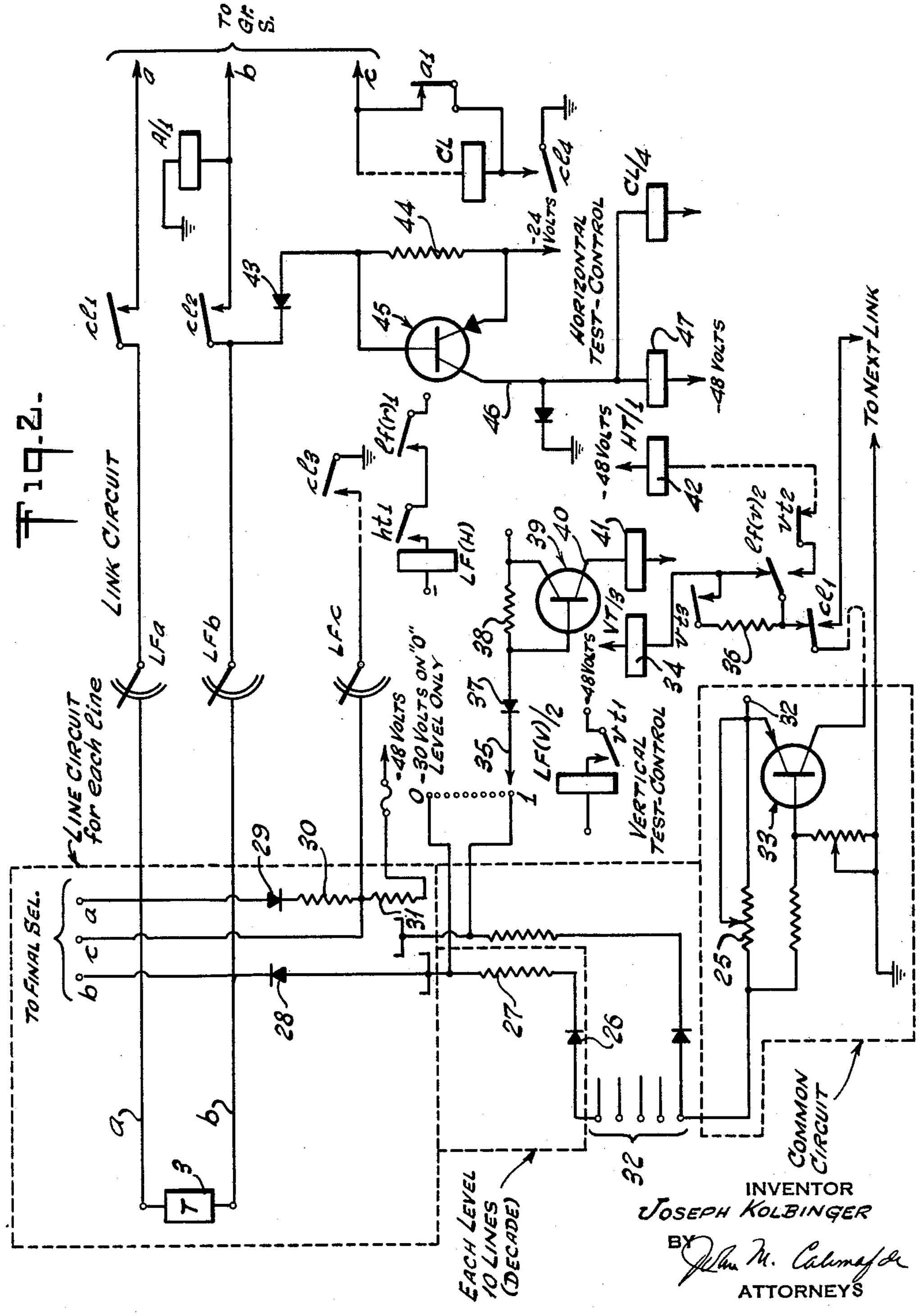

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a diagram of part of a rotary type switching system, showing relays in detached contact form; and FIG. 2 is a similar illustration of a Strowger or two-way selector switching system.

Referring to FIG. 1, a subscriber's line comprises a pair of talking wires *a*, *b* and the customary telephone 3 connected across the line.

The invention is characterized by a novel line circuit comprising a pair of low voltage switching diodes 4, 5. The function of the line circuit is to initiate connection of the calling subscriber to the link circuit at the exchange.

The line circuit is individual to a subscriber and defines a loop through the telephone which is closed when the handset is lifted. The loop comprises in series connection a first source of potential, shown as —12 volts, resistors 6, 7, diode 4, line *b*, telephone, line *a*, diode 5, resistors 8, 9 to a second source of potential shown as —24 volts.

The line circuit directly controls the operation of a call detector circuit, which controls the operation of a line finder. The call detector circuit comprises an electron discharge device, such as a vacuum tube, or preferably a transistor 10 having emitter, collector and base electrodes 11, 12, 13, respectively. The input circuit of the transistor is connected across the resistor 6. The collector potential is derived from a —24 volt source over resistor 14.

The transistor 10 is rendered conducting by the voltage developed across resistor 6 when the handset is lifted and current is flowing to the loop. The current is the collector circuit is applied over normally closed contact *st*1, which shunts resistor 15, normally closed contact *cl*4, and winding 16 of the line finder starter relay ST/2 to a source of —24 volts. The relay ST/2 is of the differential type controlling two sets of contacts *st*1 and *st*2. The contact *st*2 is in circuit with the line finder relay LF so that when the contact *st*2 is closed, the line finder relay is connected to a source of driving voltage (vibrator or relay interrupter) which causes line finders *lfa*, *lfb* and *lfc* of the rotary type to start rotating for detection of the calling line. Opening of the contact *st*1 raises the resistance in the starter relay circuit and reduces the current for a "quick" release of the relay.

Upon finding the calling subscriber's line, a complete path is formed from the source of —24 volts, through the telephone, over the *b* line, rotary line finder *lfb*, diode 17, resistor 18 to a source of —12 volts. The diode 17, resistor 18 and a transistor 19 form essentially a test circuit whose function is to stop the line finders, open the loop and temporarily mark the call detector circuit busy. The test circuit is rendered operative when the loop is conducting current; i.e., the diode 17 conducts current and the voltage across resistor 18 is sufficient to cause the transistor 19 to conduct current.

The collector circuit 20 of the transistor is divided into three branches. The first branch includes release winding 21 of the differential relay ST/2, which is energized by the current in the collector circuit to open the contact *st*2 and close contact *st*1. Opening of the contact *st*2 de-energizes the line finder relay circuit and the line finders are stopped.

The second branch of the collector circuit 20 includes relay CL/4 having contacts *cl*1 *cl*2 in wires *a*,*b*, respectively, contact *cl*3 in the conventional *c* wire (connected to resistor 9) and contact *cl*4 in the starter relay circuit. Energization of the relay CL/4 closes contacts *cl*1 and *cl*2, thereby connecting the subscriber to a line circuit. Upon closure of these contacts, the A/1 relay applies direct-current to the line for feeding the carbon transmitter, and opens contact *a*1.

The opening of contact *a*1 and the closing of contact *cl*3 completes a connection from the source of —24 volts over resistor 9, line finder *lfc*, and hold winding for relay CL/4 to ground. This serves to open the loop by blocking the diodes 4, 5. The voltage on these diodes has now been effectively reversed. This condition will continue until the contact $a1$ is again closed. Conventionally, the A/1 relay drops when the handset is again placed on the subset base. When the loop is opened, the test circuit becomes inoperative. However, while the test circuit is conducting, it is desirable to mark the call detector circuit busy. This is accomplished by connecting a third branch of the collector circuit to the base circuit of transistor 10. The third branch includes rectifier 22 and adjustable resistor 23. The resistor 23 is adjusted so that the voltage developed in this branch is sufficient to cut-off the transistor 10.

The subscriber's line is marked busy by ground being connected to the *c* arm. The connections to the final selector are conventional and illustrated schematically in FIG. 1. It is recalled that the call detector circuit is multipled to a plurality of line circuits, as shown symbolically at M. While one link is busy, the contact $cl4$ connects the call detector circuit to another link, also in the conventional manner.

Referring now to FIG. 2, a Strowger or two-way selector type switching system is illustrated schematically. The operating principles of the diode controlled loop, the call detector circuit and the test circuit are substantially the same as the corresponding circuit in the rotary switching system illustrated in FIG. 1.

The talking wires are denoted *a* and *b* in FIG. 2 and the telephone is shown at 3. The loop comprises a first source of potential of —24 volts, adjustable resistor 25, diode 26 and resistor 27, diode 28, line *b*, telephone 3, line *a*, diode 29, resistors 30 and 31 to a second source of potential shown as —48 volts. The diodes 28 and 29 are in the line circuit and are individual to each subscriber's line, as in the previous embodiment. The diode 26 and resistor 27 are common to the different levels of the vertical two-way selector. Each of the levels shown at 32 comprises ten lines.

Upon lifting the handset, a circuit is completed through the loop and the loop conducts current. The voltage drop across resistor 25 is sufficient to render transistor 33 conducting in the call detector circuit. The current in the collector of transistor 33 passes through contacts $cl1$ and $lf(v)2$ through coil 34 of relay VT/3, thereby energizing the coil and operating the contacts $vt1$, $vt2$ and $vt3$.

The closing of contact $vt1$ closes the circuit for operation of the vertical line finder relay LF(V)/2. Energization of this relay drives the test arm 35 from level 1 successively to level zero, until the arm detects the calling line. Conventionally, a calling line is identified by a more negative potential.

Simultaneously, with the closing of contact $vt1$, contacts $vt2$ open and $vt3$ close. The contact $lf(v)2$ opens almost simultaneously with the closing of contact $vt3$, so that resistor 36 is promptly placed in the winding circuit of relay VT/3, thereby reducing the current in this circuit. The contact $lf(v)2$ is now closed on the $vt2$ contact, which was opened by operation of relay LF(V)2. However, upon detecting a calling subscriber's line, the test arm 35, comprising diode 37 and resistor 38, conducts current and produces a voltage drop across resistor 38. This voltage drop is sufficient to render transistor 39 conducting and the current in the collector 40 energizes release winding 41 of the relay VT/3, thereby moving the contacts to their original position, as shown.

The contact $lf(v)2$ being closed on the $vt2$ contact completes a circuit from transistor 32 over collector 33, contact $cl1$, contact $lf(v)2$ and contact $vt2$ to winding 42 of horizontal line finder starter relay HT/1. Energization of this relay closes contact $ht1$ and completes the circuit of the horizontal line finder relay LF(H). The horizontal line finder is conventional and drives the horizontal section of the two-way selector. The line finders are shown schematically illustrated in the figure in the respective lines at LF*a*, LF*b* and LF*c*.

Upon detecting the calling line, as in the previous embodiment, current flows over line *b*, line finder LF*b*, through the test circuit comprising diode 43, resistor 44 and source of potential shown as —24 volts. The current in this circuit produces a voltage drop across resistor 44 sufficient to render conducting transistor 45. The current in the collector 46 of transistor 45 flows in three branches, one branch including release winding 47 of relay HT/1; a second branch including relay CL/3 for closing contacts $cl1$, $cl2$ in the line circuit, and contact $cl3$ in the line serving to open the loop. Energization of the release winding 47 stops the horizontal section of the two-way selector (not shown), so that the link circuit is connected to the subscriber's line.

As in the previous embodiment, the closing of contact $cl3$ connects the source of voltage, shown as —48 volts, to ground. In other words, the diodes 28 and 29 are effectively blocked, and the loop circuit is opened. The ground connection is held by the closed contact $cl4$, maintaining the hold winding of relay CL/4 energized. The hold winding is de-energized when the handset is replaced on the base, causing the A1 contact to short circuit the winding.

The lockout connection of the call detector circuit is effected by a third branch in the collector's circuit 46 of transistor 45, similar to the corresponding circuit in the previous embodiment.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A circuit in a telephone system for connecting a calling subscriber's wires to a line circuit, comprising a pair of switching diodes connected respectively to the wires of a subscriber's line, and serially in a loop through the subscriber's telephone, means for energizing said loop so that when the subscriber lifts his handset current flows in the loop, a line finder relays a call detector circuit coupled to said loop and including means operative in response to current flowing in said loop for operating said line finder relay, a line finder for each of the subscriber's wires responsive to the operation of said line finder relay for detecting the calling subscriber, a link circuit having normally open contacts connected to said line finders, a test circuit connected to one of said line finders and operative in response to the current flowing in said loop when said line finder detects a calling subscriber line, said test circuit in its operating condition including a first means for rendering inoperative said means operating said line finder relay, a second means for closing said normally open contacts in said link circuit and for opening said loop, whereby said subscriber wires are connected to said link circuit and said line circuit is disconnected from the talking wires.

2. The line circuit according to claim 1, wherein said call detector circuit is common to a plurality of line circuits and said switching diodes are individual to each subscriber's line, and further comprising means coupled between said test circuit and said call detector circuit for maintaining said call detector circuit inoperative while said loop is conducting current.

3. The line circuit according to claim 1, wherein said switching diodes comprise germanium diodes.

4. The line circuit according to claim 2, wherein said loop comprises in series connection: a first voltage source, a first resistor, one of said diodes, said telephone, the other of said diodes, a second resistor and a second voltage source more negative than said first source, said call detector circuit being coupled across said first resistor and operative in response to the voltage developed thereacross, and said test circuit further comprising a lead extending from a terminal of said second resistor, a line finder connected in said lead, a hold relay winding for said contacts in said link circuit connected to said last mentioned line finder, and a normally open contact, closed by the operation of said second means in said test circuit, connected on one side to said hold relay winding and on the other side to ground, whereby in response to the operation of said test circuit said loop is opened by said second source of voltage being connected to ground.

5. The line circuit according to claim 4, wherein said call detector circuit comprises an electron discharge device having input, output and control electrodes, the input and control electrodes being connected across said first resistor and the voltage across said electrodes being sufficient to cause said device to conduct and the output electrode being coupled over a normally closed contact to said means for operating said line finder relay, said last mentioned contact being opened by said second means in said test circuit.

6. The line circuit according to claim 5, wherein said electron discharge device comprises a transistor having emitter, collector and base electrodes corresponding to said input, output and control electrodes respectively.

7. The line circuit according to claim 5, wherein said test circuit comprises a diode, resistor and source of potential connected in series, the diode being poled so as to conduct current into said loop when said line finder has detected a calling subscriber and when said loop is conducting current, a second electron discharge device having input, output and control electrodes, the input and control electrodes being connected across said resistor, the voltage across said resistor, during the conduction of said diode, being sufficient to cause said electron discharge device to conduct, said first and second means comprising two circuit branches connected to said output electrode, said first branch including a release winding for said line finder relay whereby the line finder is stopped upon detecting the calling line, and said second branch including a relay winding for controlling the contacts in the link circuit, the contact in series with the line finder relay and the contact in the lead extending from said second resistor in said loop, whereby the loop is opened.

8. The circuit according to claim 7, and further comprising a third branch circuit connected to said output electrode of said second discharge device, said third branch circuit including a series circuit comprising a rectifier and a resistor connected to the control electrode of said first discharge device, the voltage developed across said series circuit being sufficient to cut-off the conduction of said first electron discharge device, whereby upon cut-off of said first discharge device said detector is capable of responding to other calling subscribers.

9. The circuit according to claim 8, wherein said second electron discharge device comprises a transistor.

References Cited in the file of this patent

UNITED STATES PATENTS

| | | |
|---|---|---|
| 2,860,190 | Allum et al. | Nov. 11, 1958 |
| 2,870,261 | Van Lottum | Jan. 20, 1959 |
| 2,921,140 | Abbott | Jan. 12, 1960 |
| 2,938,959 | McCreary | May 17, 1960 |